United States Patent
Brockhaus et al.

(10) Patent No.: US 12,246,477 B2
(45) Date of Patent: Mar. 11, 2025

(54) HOT RUNNER NOZZLE FOR LATERAL GATING

(71) Applicant: EWIKON HEIßKANALSYSTEME GMBH, Frankenberg (DE)

(72) Inventors: Sebastian Brockhaus, Frankenberg (DE); Stefan Eimeke, Frankenberg (DE); Norbert Zölzer, Vöhl (DE)

(73) Assignee: EWIKON Heißkanalsysteme GmbH, Frankenburg (DE)

( * ) Notice: Subject to any disclaimer, the term of this patent is extended or adjusted under 35 U.S.C. 154(b) by 139 days.

(21) Appl. No.: 18/009,369

(22) PCT Filed: Jun. 10, 2021

(86) PCT No.: PCT/EP2021/065679
§ 371 (c)(1),
(2) Date: Dec. 9, 2022

(87) PCT Pub. No.: WO2021/254883
PCT Pub. Date: Dec. 23, 2021

(65) Prior Publication Data
US 2023/0219268 A1    Jul. 13, 2023

(30) Foreign Application Priority Data
Jun. 17, 2020   (DE) ............. 10 2020 115 942.0

(51) Int. Cl.
*B29C 45/20*   (2006.01)
*B29C 45/27*   (2006.01)
*B29C 45/28*   (2006.01)

(52) U.S. Cl.
CPC ........... *B29C 45/278* (2013.01); *B29C 45/20* (2013.01); *B29C 45/2735* (2013.01);
(Continued)

(58) Field of Classification Search
CPC .............. B29C 45/278; B29C 45/2735; B29C 45/2806
See application file for complete search history.

(56) References Cited

U.S. PATENT DOCUMENTS 4,094,447 A  *  6/1978  Gellert ................ B29C 45/2735
                                                          425/570
7,658,605 B2    2/2010  Fairy
(Continued)

FOREIGN PATENT DOCUMENTS

CN        201579950 U      9/2010
CN        203371740        1/2014
(Continued)

OTHER PUBLICATIONS

Office Action dated Apr. 26, 2024 in related/corresponding CN Application No. 202180044283.8.
(Continued)

*Primary Examiner* — Timothy Kennedy
(74) *Attorney, Agent, or Firm* — PATENT PORTFOLIO BUILDERS PLLC

(57) ABSTRACT

A hot runner nozzle for the lateral gating of plastic components has a nozzle body and a pressure lid. Tip elements are arranged between the nozzle body and the pressure lid, which are each inserted into a recess of the nozzle body and are each penetrated by a movable closure needle having a tip, which in at least one operating position protrudes in each case over an outer circumferential edge of the nozzle body. The closure needles each include, on their ends facing away from the tip, a coupling means, which is coupled to a drive means for moving the closure needles. The tip elements are supported on their side facing away from the respective tip of the closure needles on a buttress element inserted between the nozzle body and the pressure lid.

24 Claims, 8 Drawing Sheets

(52) U.S. Cl.
CPC .. *B29C 45/2806* (2013.01); *B29C 2045/2777* (2013.01); *B29C 2045/2779* (2013.01); *B29C 2045/2783* (2013.01)

(56) References Cited

U.S. PATENT DOCUMENTS

| | | | | |
|---|---|---|---|---|
| 7,850,442 | B2 * | 12/2010 | Fairy | B29C 45/2735 |
| | | | | 425/573 |
| 7,918,663 | B2 | 4/2011 | Kaushal et al. | |
| 8,899,963 | B2 | 12/2014 | Braun | |
| 11,254,039 | B2 | 2/2022 | Overfield et al. | |
| 2004/0009259 | A1 | 1/2004 | Manner | |
| 2006/0222730 | A1 * | 10/2006 | Barth | B29C 45/2735 |
| | | | | 425/562 |
| 2008/0044513 | A1 * | 2/2008 | Babin | B29C 45/2703 |
| | | | | 425/564 |
| 2008/0160125 | A1 | 7/2008 | Fairy | |
| 2010/0092602 | A1 | 4/2010 | Gunther et al. | |
| 2011/0033570 | A1 | 2/2011 | Braun | |
| 2012/0118999 | A1 | 5/2012 | Braun | |
| 2013/0056562 | A1 | 3/2013 | Overfield et al. | |
| 2013/0243899 | A1 | 9/2013 | Babin et al. | |
| 2018/0370103 | A1 | 12/2018 | Günther et al. | |
| 2019/0329469 | A1 | 10/2019 | Bajwa et al. | |
| 2019/0366611 | A1 * | 12/2019 | Eimeke | B29C 45/281 |

FOREIGN PATENT DOCUMENTS

| | | | | |
|---|---|---|---|---|
| CN | 205324094 | U | 6/2016 | |
| CN | 109476059 | A | 3/2019 | |
| DE | 10231093 | C1 | 10/2003 | |
| DE | 202008013086 | U1 | 8/2009 | |
| DE | 102009048368 | A1 | 4/2011 | |
| DE | 112010000954 | T5 | 8/2012 | |
| DE | 102009048368 | B4 | 7/2013 | |
| EP | 0743157 | B1 | 8/2000 | |
| EP | 1938945 | A1 | 7/2008 | |
| EP | 2308664 | A1 | 4/2011 | |
| EP | 2701890 | B1 | 10/2016 | |
| EP | 3611005 | A1 | 2/2020 | |
| WO | WO-2008004968 | A1 * | 1/2008 | B29C 45/2735 |
| WO | 2010127965 | A2 | 11/2010 | |
| WO | 2012115614 | A2 | 8/2012 | |

OTHER PUBLICATIONS

International Search Report and Written Opinion mailed Sep. 28, 2021 in related/corresponding International Application No. PCT/EP2021/065679.

Search Report created Dec. 22, 2020 in related/corresponding DE Application No. 10 2020 115 942.0.

* cited by examiner

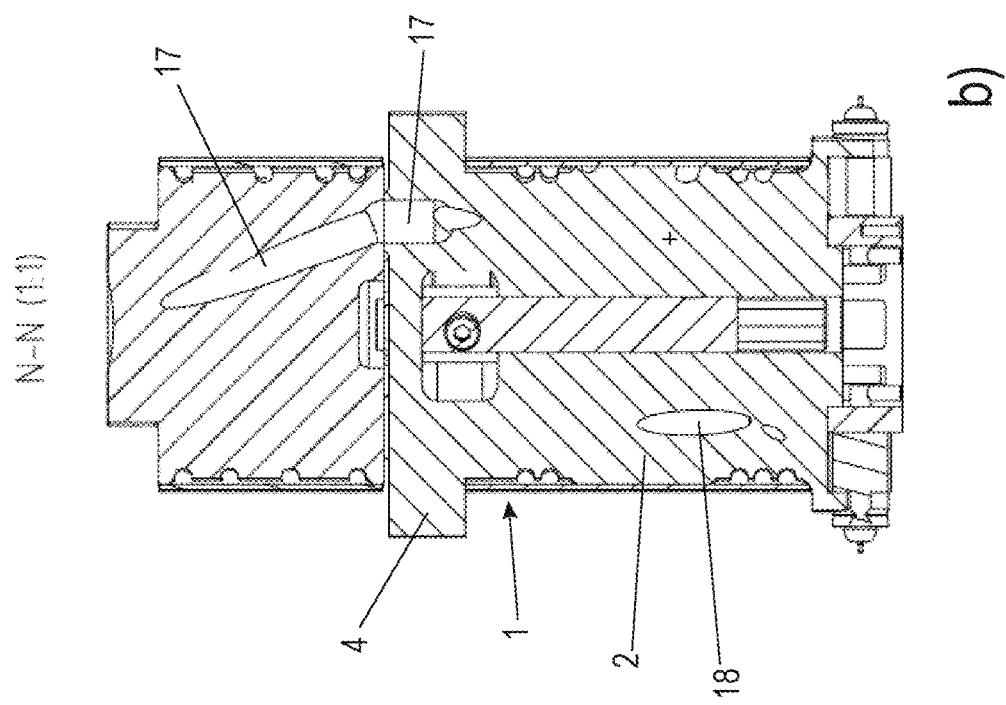
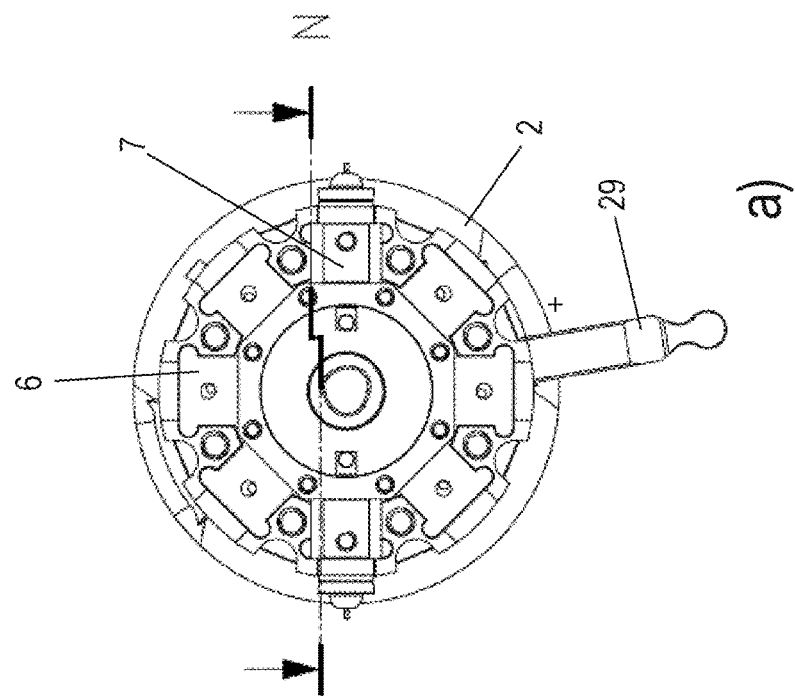
Fig. 5

HOT RUNNER NOZZLE FOR LATERAL GATING

BACKGROUND AND SUMMARY OF THE INVENTION

Exemplary embodiments of the invention relate to a hot runner nozzle for lateral gating.

There is often the necessity in plastic injection molding technology of gating plastic parts laterally, i.e., perpendicularly or obliquely to the demolding direction. For this purpose, so-called hot runner nozzles for lateral gating, also called lateral gating nozzles, are used, which include a nozzle body and tip elements. To achieve good temperature control for the melt up to the article surface, the nozzle tips or the tip elements are to be guided up to the article surface. WO 2010/127965 A2 is cited with respect to this technological background.

Proceeding from this solution, the invention begins with the object of further structurally optimizing the constructions known from WO 2010/127965 A2 in a structurally simple manner.

According to embodiments, a hot runner nozzle for the lateral gating of plastic components has a nozzle body and a pressure lid, wherein tip elements are arranged between the nozzle body and the pressure lid, which are each inserted in a recess of the nozzle body and are each penetrated by a movable closure needle having a tip, each of which protrudes beyond an outer circumferential edge of the nozzle body at least in an operating position, wherein the closure needles each have, on their ends facing away from the tip, a coupling means that is coupled to a drive means for moving the closure needles.

It is furthermore provided that the tip elements are furthermore supported on their side facing away from the respective tip of the closure needles on a buttress element inserted between the nozzle body and the pressure lid.

The buttress element of this type, which is separately installable on the nozzle body and preferably removable, on the one hand, facilitates the installation of the tip elements and, on the other hand, also facilitates the removal, for example during maintenance. Moreover, it contributes in a simple manner to very good support of the respective tip element, wherein nonetheless a simple structural design is achieved, in which the ends of the closure means can be coupled well to the drive means.

The closure needle(s) can have or approach one, two, or more of the operating positions. The closure needles can thus preferably, in order to influence the gate quality and/or the melt flow, be moved into one respective particularly suitable operating position of multiple operating positions.

The operating position can be influenced directly or via a corresponding activation or a corresponding design of the drive means.

It can also be provided that this activation and/or design is performed in such a way that the closure needles can have different speeds during an opening or closing movement.

It is possible in particular upon use of an electric drive to position the respective closure needles very accurately and to approach the position at a predetermined speed or a speed curve as a function of the injection curve over the injection time. The closure needle can influence the melt flow rate in the melt outlet region. The closure needle can also protrude into the mold through the controller and can be retracted to the surface of the mold. The positioning of the different operating positions is performed by the drive means of the respective closure needle(s), wherein the position of the closure needle(s) is approached at a predetermined speed or a speed curve.

According to one preferred variant, the tip elements each include a heat conduction body and the respective closure needle penetrating it completely—for example toward both sides.

According to a further preferred variant, the tip elements furthermore each include a needle seal and guide sleeve, which the respective closure needle also completely penetrates—for example toward both sides. This needle seal and guide sleeve ensures a good seal and a good guide of the movable closure needles toward the buttress.

Preferably, a seal sleeve section for supporting the tip element on the side facing away from the buttress element on a tool can be formed on the heat conduction body. It can be integrally formed with the heat conduction body or formed as a separate sleeve from the heat conduction body.

It can furthermore advantageously be provided that the seal sleeve section consists of a material of lower thermal conductivity than the heat conduction body, so that the heat conduction through the seal sleeve section can be kept low. The seal sleeve section can thus consist, for example, of titanium or a titanium alloy and the heat conduction body of copper or a copper alloy.

It can be provided that the buttress element includes a ring-shaped, cuboid, or polygonal base body, on which at least two elements are supported directly or indirectly.

The invention is therefore implementable well on hot runner nozzles having different geometrical formations, wherein it is not restricted to the above-described shapes.

It can furthermore be provided that the tips of the closure needles protrude beyond the outer circumference of the nozzle body—at least in one of the functional positions into which the respective closure needle is movable—wherein the buttress element is arranged essentially in each case between the drive means and the tip elements. The invention is implementable easily and well on hot runner nozzles having different geometrical formations in this way.

According to a further embodiment, it can expediently and advantageously be provided that the buttress element includes at least one bridge section, wherein at least one bridge section is penetrated by one of the closure needles, wherein the end of the closure needle facing away from the tip protrudes from the bridge section, where the coupling means is coupled to the drive means.

A coupling of the closure needle to the drive means can be implemented easily in this way, without the buttress element obstructing this connection.

It can furthermore be provided according to a further option that the respective bridge section of the ring-like buttress element overlaps the step of the heat conduction body or the needle seal and guide sleeve of the respective tip element, so that the tip element is particularly advantageously supported.

It can furthermore advantageously be provided that the ring-like buttress element is designed so that it is installable after the tip elements and is removed before them, which simplifies the overall installation and removal of the tip elements.

It is structurally simple if the coupling means are formed as one-part or multipart shaped elements. These can be formed, for example, as angles or hammerheads, which each engage in the drive means. The drive means can include multiple slotted guides in which the corresponding shaped elements engage.

It can advantageously be provided here that the slotted guides of the ring-like drive means are aligned in sections or completely obliquely to the movement direction of the drive means in order to move the closure needles forward and back.

The slotted guides can be formed straight or curved, for example.

The slotted guides can be formed as oblong holes according to one variant, however, they can also be formed closed toward one side.

With respect to the needle seal and guide sleeve, it can advantageously be provided that it is screwed into the heat conduction body so that it is fastened easily and securely therein.

It can then be provided that the needle seal and guide sleeve is formed having a through hole for the sealed guiding of the closure needle. This means that the gap between closure needle and the hole of the needle seal and guide sleeve is dimensioned narrow, so that, on the one hand, axial mobility of the closure needle is provided but, on the other hand, melt cannot pass through the needle seal and guide sleeve to a practically significant extent. The closure needle and the needle seal and guide sleeve preferably have essentially equal or equal coefficients of thermal expansion for this purpose.

It is advantageous if a hole is formed in the heat conduction body which the closure needle penetrates, wherein a ring channel is formed around the closure needle between the end of the heat conduction body facing toward the tip and the needle seal and guide sleeve, which channel is formed to conduct through melt. It can furthermore be provided that at least one, two, or more feed hole(s) extending obliquely to the ring channel is/are formed in the heat conduction body to feed melt from the nozzle body into the ring channel.

It can furthermore be provided that the needle seal and guide sleeve is screwed into the heat conduction body. It is easily pre-installable therein and held securely in the heat conduction body in this way.

In addition, a particularly advantageous nozzle holder is provided. According to a further variant, it can advantageously be provided that the buttress element is designed to be removable and it preferably includes a removal means for the removal. The buttress element can be replaced easily in this way.

It can be provided in a structurally advantageously simple manner that the ring-like buttress element is arranged radially outside a drive ring that forms the drive means.

Only a single buttress element can be provided, so that also only a single buttress element is to be installed and to be removed if necessary. However, this is not required. It can also be provided that multiple buttress elements are used between the nozzle body and the pressure lid.

It can finally advantageously be provided that the support of a tip element is arranged at the buttress element between the tip of the closure needle and the drive means.

It can furthermore be provided that the respective closure needle is positionable in different operating positions or is positioned in operation using the drive means and/or that the position of the closure needle is approachable or is approached in operation at a predetermined speed or a speed curve.

The invention also provides an advantageous and simple method for removing one or more tip elements of a hot runner nozzle, having a nozzle body and a pressure lid, wherein the tip elements are arranged between the nozzle body and the pressure lid, which tip elements are each inserted into a recess of the nozzle body and are each penetrated by a movable closure needle having a tip, each of which protrudes beyond an outer circumferential edge of the nozzle body at least in an operating position, wherein the closure needles each include a coupling means on their ends facing away from the tip, which is coupled to a drive means for moving the closure needles, wherein the tip element or elements are supported on a buttress element inserted between the nozzle body and the pressure lid, wherein the method comprises the following steps:

100) the pressure lid is removed;
200) after step 100), the one-part or multipart drive means is removed, whereby the respective tip element is decoupled from the drive means,
300) after step 200), the at least one buttress element is or the multiple buttress elements are removed; and
400) after step 300) the tip element or elements is/are removed.

This removal method is particularly simple since it is possible to remove the respective tip element from the hot runner nozzle directly after a removal of the drive means associated with it and the buttress element associated with it, in order to replace it.

BRIEF DESCRIPTION OF THE DRAWING FIGURES

In the following, the invention is explained in greater detail on the basis of exemplary embodiments with reference to the drawings. The solutions of the illustrated figures are particularly advantageously suitable for the nozzle bodies and tip elements illustrated in the following figures. However, the invention is not restricted to these special embodiments but can also be implemented in other ways in the scope of the claims. In the figures:

FIGS. 1a-c show in a) a perspective view of a section of a hot runner device having hot runner nozzle having a multipart nozzle body having tip elements inserted therein and a closure needle in addition to a drive device for the closure needle and in b) the arrangement from a) without pressure lid and in c) an installation of a tip element using an installation tool;

FIG. 2 shows an exploded view of the elements from FIG. 1a;

Figure 1:
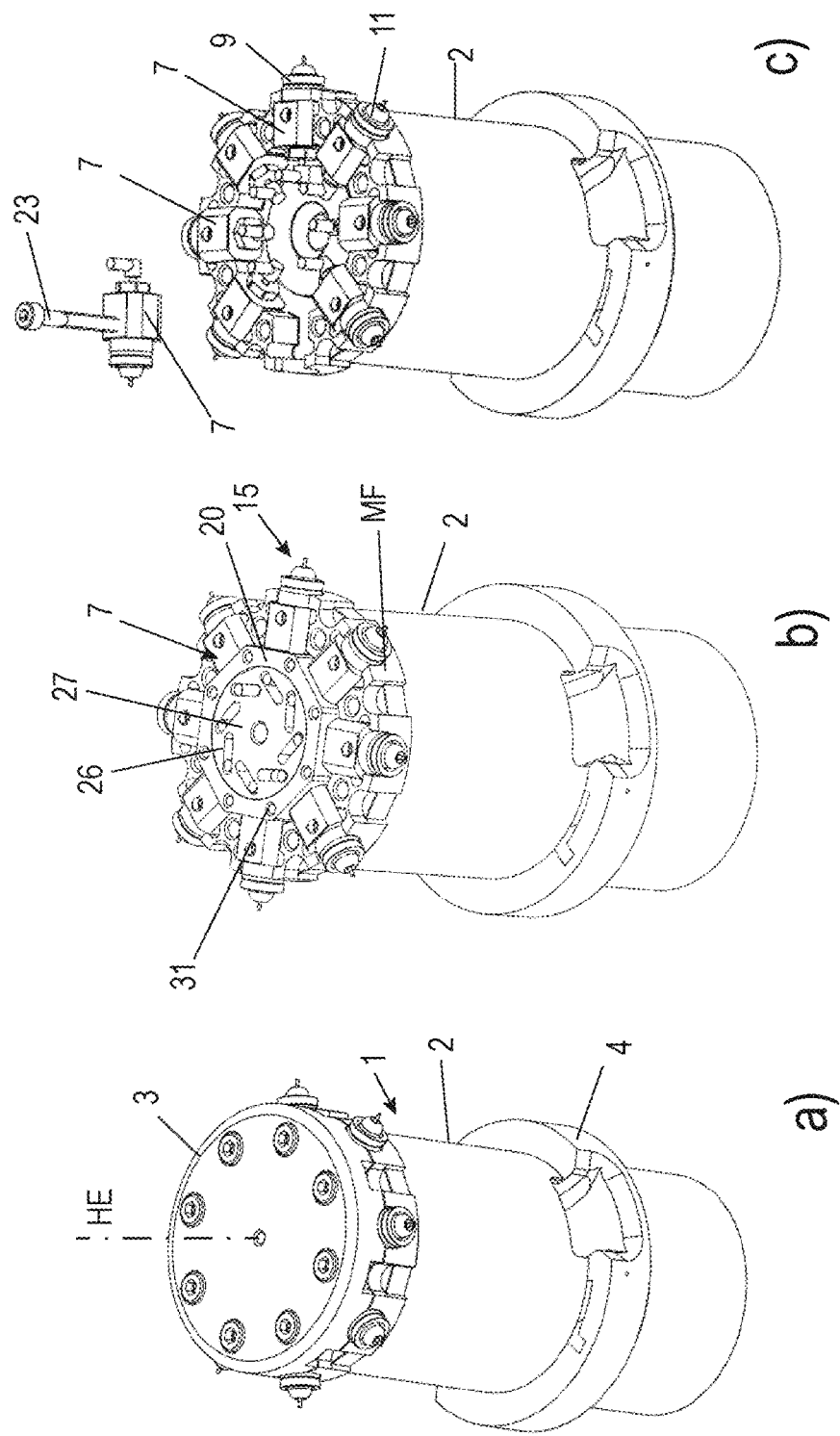
Figure 4:
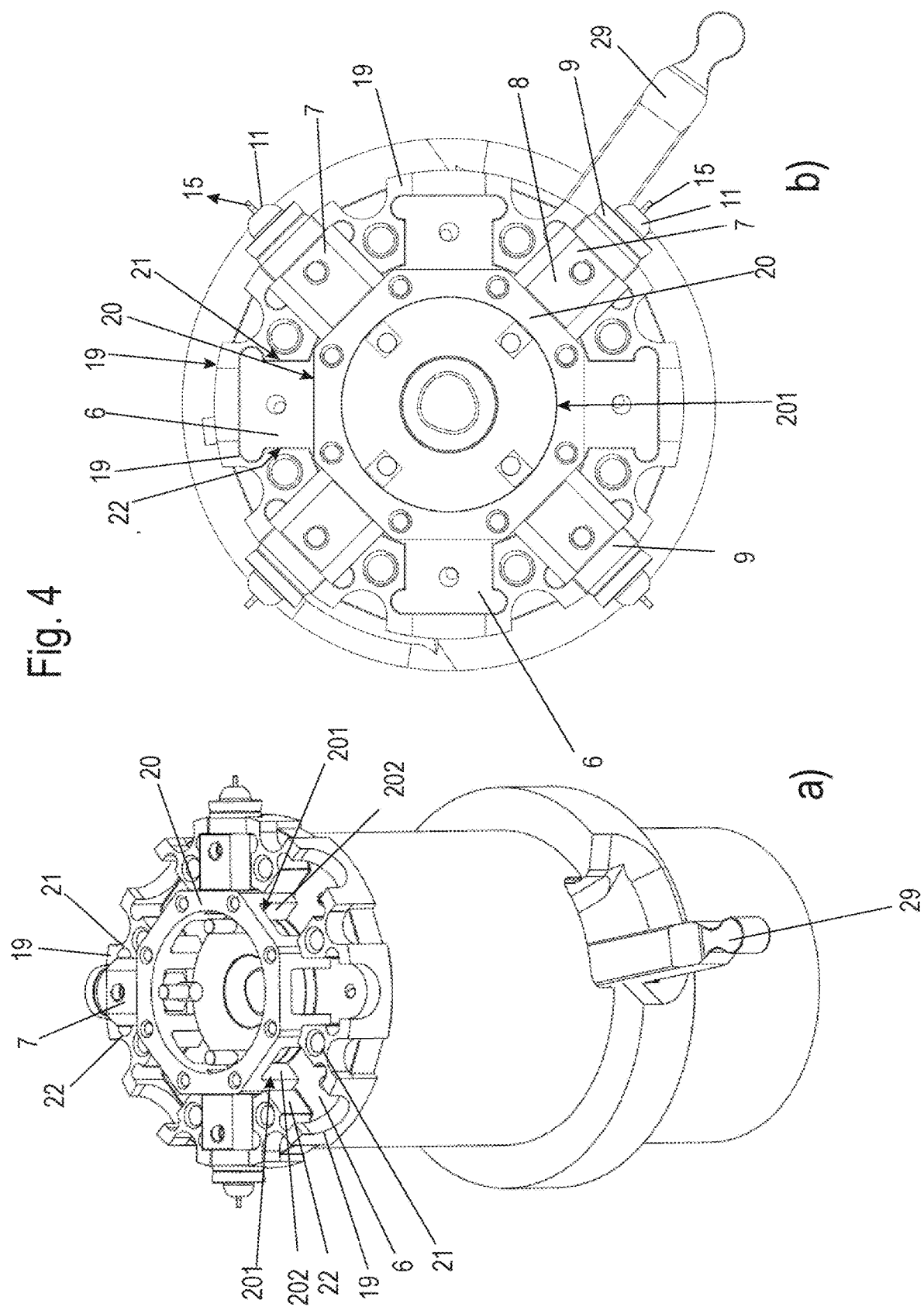
Figure 6:
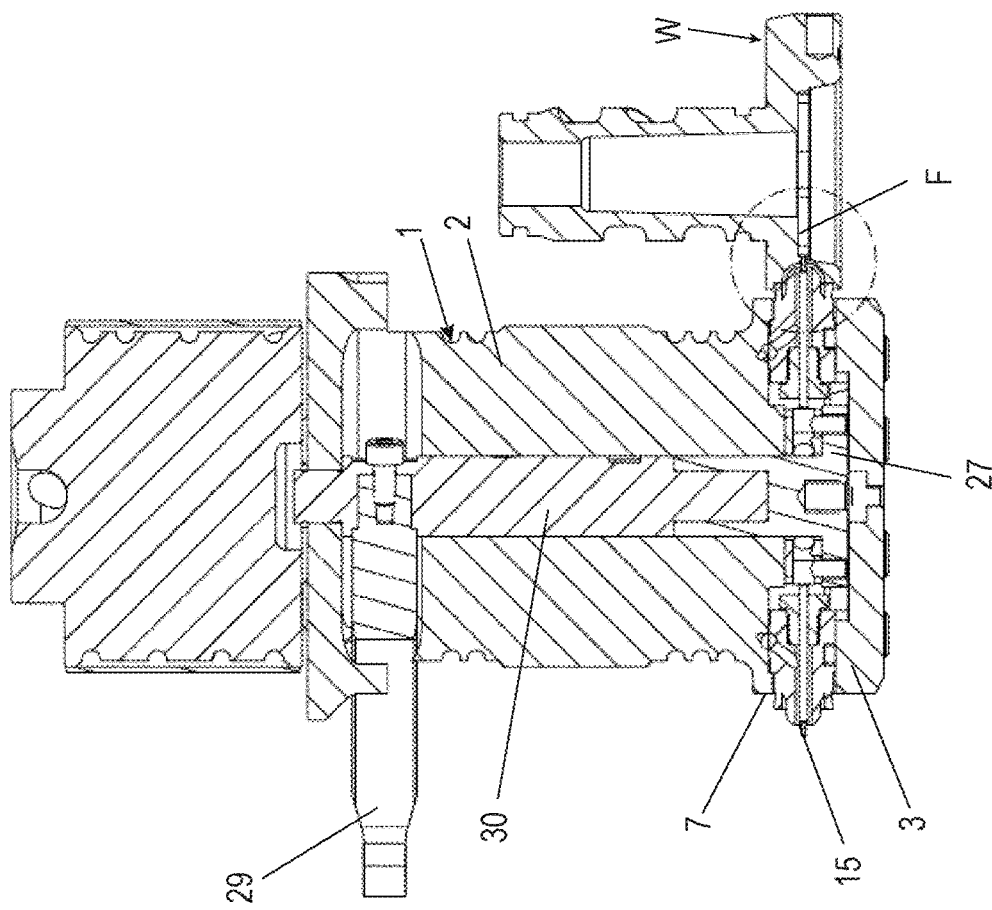
Figure 7:
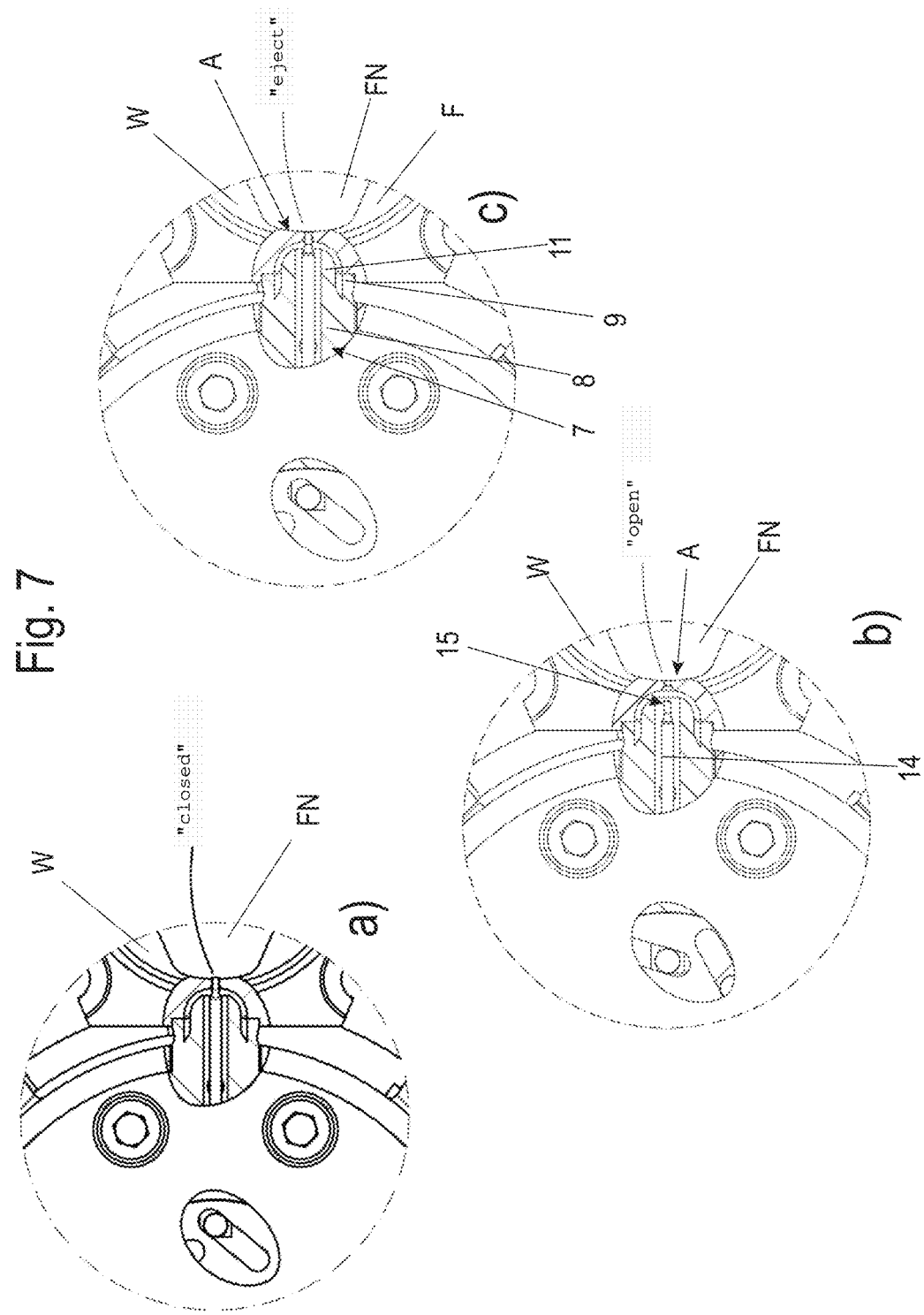
Figure 8:
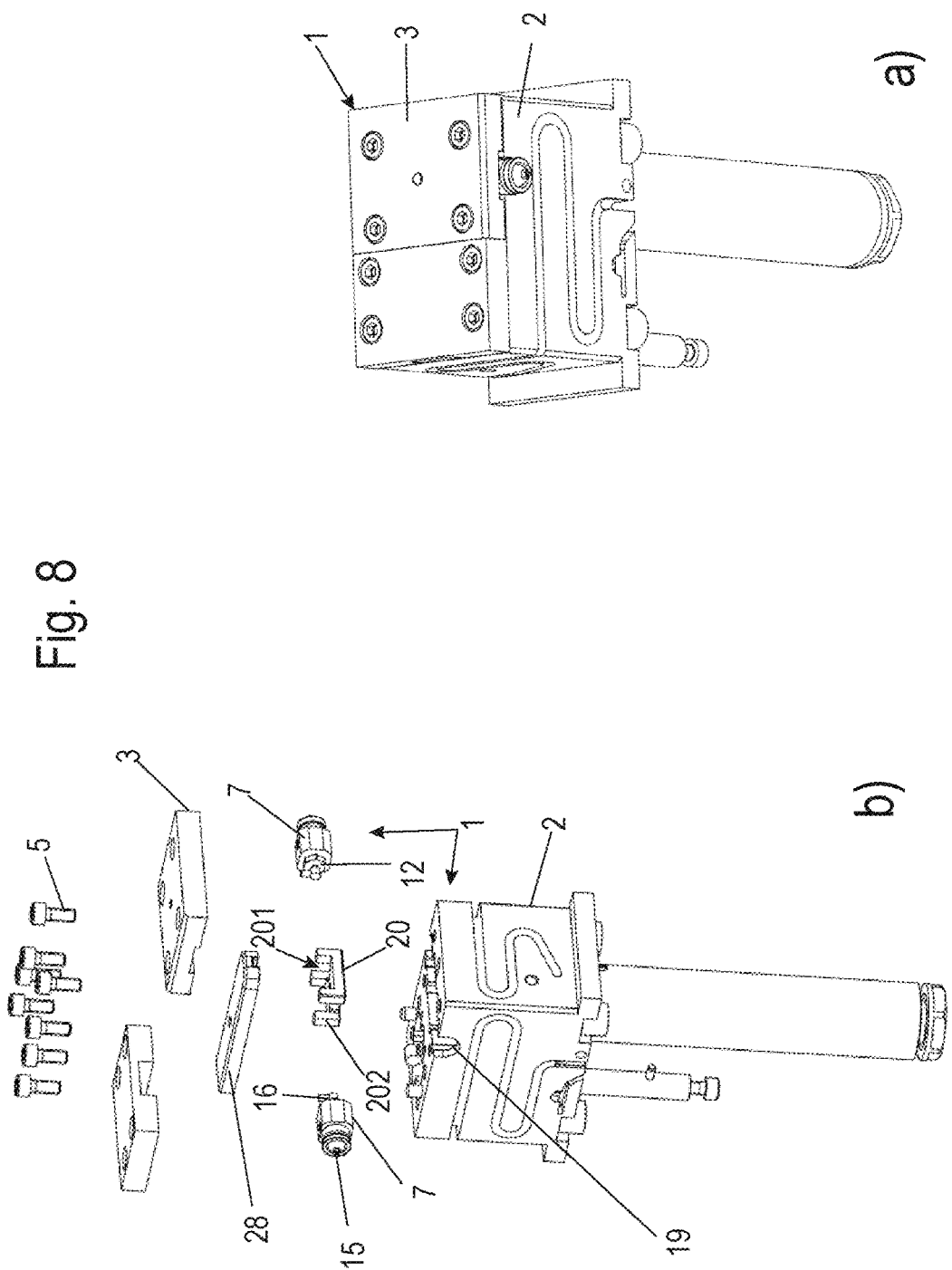

FIGS. 4a, b show in a) a perspective view of the hot runner nozzle from FIG. 1a without pressure lid and drive ring but having some tip elements and having a buttress and pressure ring and in b) shows a top view of the arrangement from a);

FIGS. 5a, b shows the arrangement from FIG. 4 with two tip elements without pressure lid with a drive lever, in a) in a top view and in b) in section;

FIG. 6 shows a section through a hot runner nozzle of the type according to FIGS. 1 and 5 on a tool;

FIG. 7 shows in a), b), and c) a top view of a section of a pressure lid of a hot runner nozzle having a region in partial section of a tip element on a mold cavity of a tool in three different operating positions; and FIG. 8 shows in a) and b) a perspective view and an exploded view of a further hot runner nozzle.

DETAILED DESCRIPTION

Terms such as "top" or "bottom" are not to be understood as restrictive, but solely relate to the respective arrangement and alignment in the figures.

FIG. 1 shows a section of a hot runner device having a hot runner nozzle 1, which is designed for lateral gating of plastic components.

For this purpose, the hot runner nozzle 1 for lateral gating includes a nozzle body 2 and a pressure or clamping lid 3 releasably fastened on the nozzle body 2.

The hot runner nozzle 1 can furthermore include a nozzle holder 4, using which the hot runner nozzle or its nozzle body 2 can be fixed on further elements (not shown here) of the hot runner device.

Figure 2:
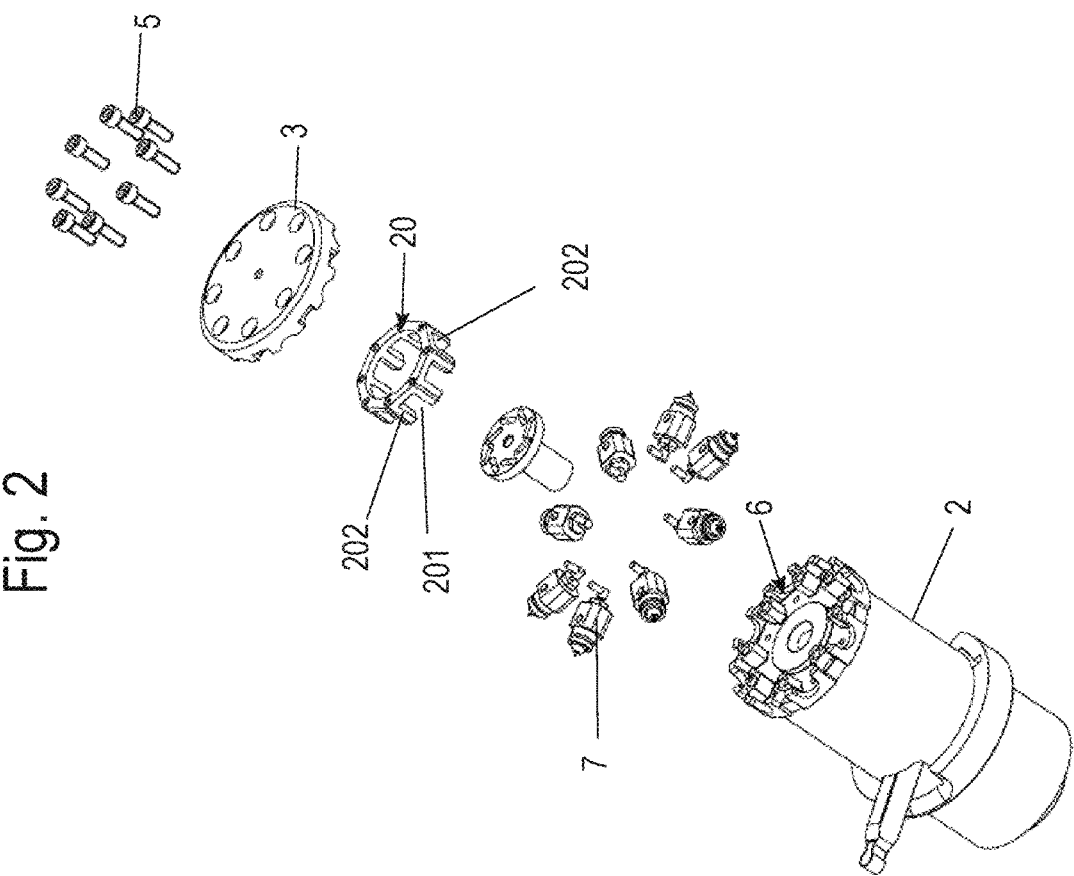

The pressure lid 3 can be releasably fastened on the nozzle body 2 using a fastening means, for example formed as one or more screws 5 (FIG. 2).

The nozzle body 2 can have an approximately cylindrical base shape, so that it then has an approximately cylindrical outer jacket having a lateral surface MF. Such an exemplary embodiment is shown in FIGS. 1a-c. However, the invention is not restricted thereto. The nozzle body 2 can also have a different base shape. It is thus formed approximately cuboid in the exemplary embodiment of FIG. 8, so that it has a correspondingly cuboid lateral surface.

The nozzle body 2 has a main extension direction HE by definition. In a cylindrical base shape, this can be the longitudinal axis of the cylinder.

The gating or extrusion of plastic melt takes place laterally, in particular perpendicularly, to the main extension direction HE, which can furthermore mean here that the extrusion of the plastic takes place precisely or approximately perpendicularly to the lateral surface MF. Melt can advantageously be ejected at multiple points of the lateral surface MF-angularly offset in the circumferential direction-perpendicularly to the lateral surface MF using the hot runner nozzle 1.

To implement this, various functional elements and functional contours are formed between the nozzle body 2 and the pressure lid 3.

The nozzle body 2 thus has an axial side at its end facing toward the pressure lid 3, which is provided with at least one or more recesses 6, arranged radially circumferentially distributed on the axial side here by way of example, for arranging and receiving tip elements 7. Corresponding recesses are formed in the pressure lid 3 (not shown here).

One of the tip elements 7 is arranged in each of the recesses 6.

The following description of the tip elements 7 also applies for the further tip elements of FIGS. 1 to 8. When the location of only one of the tip elements or at other points multiple of the tip elements 7 is moreover described hereinafter, it is obvious that these features can also each be provided in the case of multiple tip elements 7.

Figure 3:
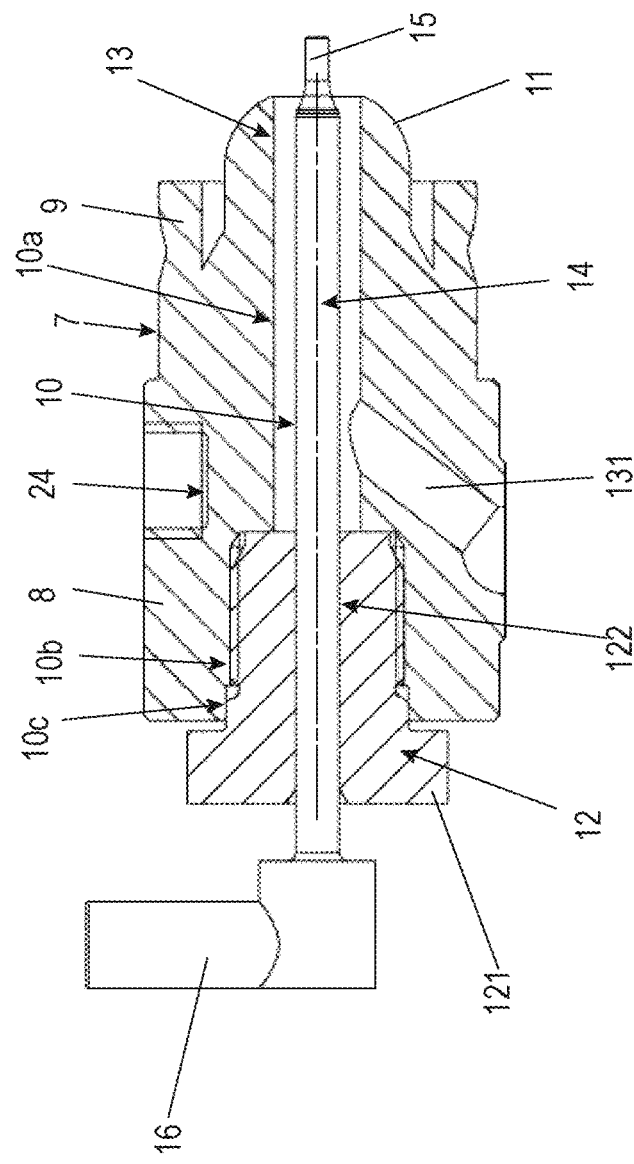
FIG. 3 shows a sectional view of a tip element.

The tip elements 7-see FIG. 3—each include a heat conduction body 8 (as a base body). The heat conduction body 8 structurally also forms a type of base body of the respective tip element 7.

The heat conduction body 8 furthermore includes a seal sleeve section 9. The seal sleeve section 9 can be formed integrally with the heat conduction body 8 (as shown here) or as a sleeve element separate therefrom (not shown here, see, for example, WO 2010/127965 A).

The heat conduction body 8 can have a type of cuboid shape, wherein the individual cuboid heat conduction bodies 8 can be approximately radially aligned on the nozzle body 1 (if the nozzle body is cylindrical).

Each heat conduction body 8 can have a hole 10 penetrating it longitudinally. This hole 10 can be formed stepped. The hole 10 can thus include hole sections 10a, b, c-three here—of different diameters.

At its one end, the heat conduction body 8 can include a type of projection 11. This projection 11 can be formed cylindrical. It is oriented toward a tool or a mold cavity (FIG. 7), but preferably does not touch it. At its other end, a seal and guide sleeve 12—also referred to synonymously in short as guide sleeve 12 hereinafter—can be inserted into the heat conduction body 8, which is formed here as a threaded sleeve having a through hole for the sealed guiding of the closure needle 14. The seal and guide sleeve 12 can be screwed into a hole section 10b, which then has an internal thread.

The respective seal and guide sleeve 12 can protrude axially out of the hole 10 and thus out of the heat conduction body 8. It can include a polygonal end 121 there, for example. The seal and guide sleeve 12 itself includes a through hole 122.

The entire tip element 7, thus both the heat conduction body 8 and also the seal and guide sleeve 12, are axially penetrated by a closure needle 14, which moreover protrudes on both sides axially out of the tip element 7. The diameter of the closure needle 14 and the through hole 122 are matched so that the closure needle 14 is guided sealed in this hole.

In the region of the hole section 10a in front of the seal and guide sleeve 12, in contrast, the diameter can be selected so that a ring channel 13 is formed, preferably concentrically, around the closure needle 4, through which melt can be conducted up into the region of a tip 15 of the closure needle 14, which can protrude out of the heat conduction body 8.

At least one feed hole 131 aligned obliquely to the ring channel 14 can open into the ring channel 13, through which melt can be conducted out of the nozzle body 2 into the ring channel 13. Multiple such feed holes 131 per tip element 7 can also be provided.

The closure needle 14, which is displaceably guided, can protrude with a tip 15 out of the projection 11 in at least one operating position and can be moved forward and back using a drive means of the drive.

To achieve a good temperature control for the melt up to the article surfaces, the closure needles 14 are to be guided with their tip 15 up to the article surface (FIG. 6, FIGS. 7a-c). The plastic part to be injected or manufactured is injected into a mold W (also referred to as a molding tool hereinafter), of which, inter alia, a mold plate F is shown here, which includes a gate hole A, which is associated with a mold cavity FN. The gate hole A for the plastic is closable by the closure needle 14, the tip of which seals closed the gate hole A of the mold plate F in the closed position of FIG. 7a, so that plastic can no longer enter the mold. The closure needle 14 including tip 15 is retracted in FIG. 7b, so that melt can flow through the gate hole A. An ejection position for ejecting the plastic part is shown in FIG. 7c.

On its axial side-top in FIG. 1-facing away from the pressure lid 3, the nozzle body 2 includes at least one melt entry opening into a melt channel 17 (FIG. 5—not completely visible here), which can be divided into sub-channels 18, wherein the respective sub-channel 18 opens into one of the oblique holes 131, so that melt can be conducted through this hole 131 to the main channel 13 and the gate opening A to the mold cavity F.

To move the closure needle 14 using the drive means, the closure needle 14 includes on its end facing away from the tip 15, which protrudes out of the heat conduction body 8 and the seal and guide sleeve 12 at the end facing away from the tip 15, a coupling means 16 for coupling the closure needle 14 to the drive means. This coupling means 16 is embodied in a simple manner here as an angle, which extends approximately perpendicularly to the main extension direction of the closure needle 14.

The heat conduction body 8 of the tip element 7 forming the projection 11 at its outermost end protrudes radially outward beyond the circumferential edge of the nozzle body 2.

The tip elements 7 are designed in such a way that after insertion into the recesses 6, they are held laterally by sections of a radially outer circumferential wall 19, which can be penetrated in each case by the projection 11 and the seal sleeve 9 of the respective tip element 7, and by a rear buttress element 20 in one or more directions at least in the hot state.

The tip elements can be held laterally by further walls 21, 22 of the recesses 6. They are held on the top and bottom by the nozzle body 2 and by the pressure lid 3.

The seal sleeve 9 is furthermore supported on the mold tool W (see FIG. 4, FIG. 7*c*).

In the hot state, the respective tip element is supported in this way between the tool and the buttress element 20.

The tip elements 7 are insertable here in the cold state with some play into the recesses 6, for example, using a tool such as a screw 23 (FIG. 1*c*), which can be screwed into a threaded bore 24 of the tip elements and is releasable after the insertion. In the heated state, the tip elements are then seated securely in these recesses 6, wherein a solid seat of the heat conduction body 8 results between the buttress element 20 and the tool, on which the seal sleeve section 9 supports itself.

The buttress element 20 can be designed in such a way that it is insertable into the nozzle body 2 and removable therefrom. The buttress element 20 can in particular form a type of U-shaped bridge section 201 in each case per tip element 20. The buttress element can include a removal means for the removal. This can be designed as at least one threaded bore 31, into which a screw or the like can be screwed, using which the buttress element can then be removed (see FIG. 1*b*)). In this way, the buttress element can be easily replaced if necessary.

The respective bridge element 201 can, according to FIG. 1, overlap the tip element 7 from above from the direction of the pressure lid 3—for example in the region of the respective polygonal end or in the region of a step or the like—and secures it after the placement of the pressure lid in the main extension direction HE and preferably perpendicularly thereto, for example, radially inward.

The bridge sections 201 required all around in this way for the circumferentially distributed tip elements 7 can be combined to form an encompassing element. According to FIGS. 1 to 7, this encompassing element including multiple bridge sections 201 is a ring, for example a circumferentially closed polygonal ring.

Each bridge section 201 then overlaps, for example, the respective polygonal end 121 of the respective needle seal and guide sleeve 12. Lower webs 202 of the bridge sections 201 can be held on a collar 25 (FIG. 4*a*) or in recesses 6 or the like on the nozzle body 2, in such a way that the buttress element 20 is supported securely there.

The tip elements 7 are installable well in this way, whereupon first these (FIG. 1*c*) and then the buttress element 20, the ring-like buttress element 20 here, is installed.

In this state, the tip elements 7 are then pressed by the pressure lid 3 in the direction of a main extension direction HE on the nozzle body 2, wherein a surface of the tip element 7 can support itself at least in the heated state of the hot runner nozzle on a web 202 of the buttress element 20.

It is also provided here that the support of a tip element 7 is arranged on the buttress element 20 between the tip 15 of the closure needle 14 and the drive means 28, 29.

The coupling means 16 of the closure needles 14, for example, the angles, can engage in slotted guides 26 of a drive means, a rotatable drive ring 27 here, which is rotatable using a drive. For this purpose, the drive ring 27 can be coupled, for example, to a shaft 30 (FIG. 6), which is connected to a drive lever 29, which is movable via a motor or the like (otherwise not shown here), for example is pivotable in and opposite to the circumferential direction.

The drive ring 27 can be located radially inside the ring-like buttress element 20 in FIG. 1. By rotating the drive ring 27 with the slotted guides 26, which are aligned obliquely to the circumferential direction, the closure needles 14 can then easily be moved forward and back jointly to open or close the gate holes A.

The slotted guides 26 can be formed as straight oblong holes in which the angles engage or also in another shape.

This type of the drive is advantageous. However, another type of the drive can also be selected.

As shown in all figures, it can advantageously be provided that the support of a tip element 7 on the buttress element 20 is arranged between the tip 15 of the closure needle 14 and the drive means 28, 29.

In the exemplary embodiment of FIG. 8, the nozzle body 2 is formed cuboid. The pressure lid 3 can correspondingly be formed polygonal. It consists of two parts here. It can in turn be fixable on the nozzle body 2 using fastening means such as screws 5 (FIG. 8*b*).

Recesses 6 for tip elements 7 are in turn formed in the nozzle body 2. The tip elements 7 can be formed in the way of FIG. 3. The recesses 6 can also be provided like the recesses 6 of FIG. 1.

The drive means can be formed here not as a rotatable ring but as a linearly movable drive bar 28, which includes slotted guides (not visible here), in which the coupling means 16 engage, wherein the slotted guides can be designed so that the closure needles 14 are moved forward and back upon the linear movement of the drive bar 28.

The drive bar 28 can be movable by a drive otherwise not shown here.

The tip elements 7 can be oriented in the exemplary embodiment of FIG. 8, for example, in such a way that one or more of the tip elements 7, which face in opposite directions, are provided toward opposite sides of the nozzle body 2.

The recesses 6 can be designed similarly to the recesses of FIGS. 1 to 7. This means in each case there is a front wall 19 oriented toward the molding tool W and lateral walls 21, 22. The buttress element can in turn include one or more bridge sections 201. Two of the bridge sections are combined here by way of example to form a buttress element 20. This can be inserted into the nozzle body 2. It forms a buttress for the respective tip elements 7, which can in turn support themselves in the opposite direction on a tool.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS hot runner nozzle 1
nozzle body 2
pressure lid 3
nozzle holder 4
screws 5
recesses 6
tip elements 7
heat conduction body 8
seal sleeve section 9
hole 10
hole sections 10a, b, c
projection 11
needle seal and guide sleeve 12
polygonal end 121
through hole 122
ring channel 13
feed hole 131
closure needle 14
tip 15
coupling means 16
melt channel 17
sub-channel 18
wall 19
buttress element 20
bridge sections 201
webs 202
wall 21, 22
screw 23
threaded hole 24
collar 25
slotted guide 26
drive ring 27
drive bar 28
drive lever 29
shaft 30
removal means 31
main extension direction HE
gate hole A
mold plate F
mold tool W
mold cavity FN
lateral surface MF

The invention claimed is:

1. A hot runner nozzle for lateral gating of plastic components, the hot runner nozzle comprising:
a nozzle body;
a pressure lid; and
tip elements arranged between the nozzle body and the pressure lid, wherein each of the tip elements are inserted into a recess of the nozzle body and are each penetrated by a movable closure needle having a tip, which in at least one operating position protrudes in each case over an outer circumferential edge of the nozzle body, wherein the closure needles each include, on their ends facing away from the tip, a coupling means, which is coupled to a drive means for moving the closure needles,
wherein the tip elements are supported on their side facing away from the respective tip of the closure needles on a removable buttress element inserted between the nozzle body and the pressure lid.

2. The hot runner nozzle of claim 1, wherein the tip elements each include a heat conduction body and the respective closure needle completely penetrating the heat conduction body.

3. The hot runner nozzle of claim 2, wherein the tip elements include a needle seal and guide sleeve, which the respective closure needle completely penetrates.

4. The hot runner nozzle of claim 1, wherein the removable buttress element includes a removal means for removing the removable buttress element.

5. The hot runner nozzle of claim 2, further comprising:
a seal sleeve section formed on the heat conduction body to support the tip element on the side facing away from the removable buttress element on a tool, which is integrally formed with the heat conduction body or is formed as a separate sleeve from the heat conduction body.

6. The hot runner nozzle of claim 5, wherein the seal sleeve section consists of a material of lower thermal conductivity than the heat conduction body.

7. The hot runner nozzle of claim 1, wherein the nozzle body is cylindrical or polygonal, and two or more of the tip elements are distributed on an outer circumference of the nozzle body, wherein the removable buttress element is arranged in each case between the drive means and the tip elements.

8. The hot runner nozzle of claim 3, wherein the removable buttress element includes at least one bridge section, wherein the at least one bridge section is penetrated by one of the closure needles, wherein an end of the closure needle facing away from the tip protrudes through the at least one bridge section, where the coupling means is coupled with the drive means.

9. The hot runner nozzle of claim 8, wherein the at least one bridge section of the removable buttress element overlaps a step of the heat conduction body or the needle seal and guide sleeve of the respective tip element.

10. The hot runner nozzle of claim 1, wherein the removable buttress element is configured in such a way that it is installable after the tip elements with respect to time and is removable before the tip elements.

11. The hot runner nozzle of claim 1, wherein the coupling means is a one-part or multipart shaped element, which each engage in one of multiple slotted guides of the drive means.

12. The hot runner nozzle of claim 11, wherein the slotted guides of the drive means are oriented in sections or completely obliquely or in a curve in relation to a movement direction of the drive means.

13. The hot runner nozzle of claim 3, wherein the needle seal and guide sleeve is screwed into the heat conduction body.

14. The hot runner nozzle of claim 3, wherein the needle seal and guide sleeve has a through hole configured for sealed guiding of the closure needle.

15. The hot runner nozzle of claim 3, wherein a hole is formed in the heat conduction body, which the closure needle penetrates, wherein a ring channel, which is configured to conduct through melt, is formed around the closure needle between an end of the heat conduction body facing toward the tip and the needle seal and guide sleeve.

16. The hot runner nozzle of claim 15, wherein at least one feed hole extending obliquely to the ring channel is formed in the heat conduction body to feed melt from the nozzle body into the ring channel.

17. The hot runner nozzle of claim 1, wherein the tip elements are pressed by the pressure lid in a direction of a main extension direction on the nozzle body and wherein a surface of the tip element, at least in a heated state of the hot runner nozzle, supports itself on a web of the removable buttress element.

18. The hot runner nozzle of claim 1, wherein the pressure lid secures the separate removable buttress element in an installed state against impermissible displacement in a main extension direction.

19. The hot runner nozzle of claim 1, wherein the removable buttress element includes a ring-shaped, cuboid, or polygonal base body, on which at least two tip elements support themselves directly or indirectly.

20. The hot runner nozzle of claim 1, wherein multiple removable buttress elements are inserted between the nozzle body and the pressure lid.

21. The hot runner nozzle of claim 1, wherein a support of a tip element on the removable buttress element is arranged between the tip of the closure needle and the drive means.

22. The hot runner nozzle of claim 1, wherein the drive means is configured to position the respective closure needle in different operating positions.

23. The hot runner nozzle of claim 1, wherein the drive means is configured to position the respective closure needle in different operating positions and the position of the closure needle is approachable at a predetermined speed or a speed curve.

24. A method for removing one or more tip elements of a hot runner nozzle, having a nozzle body and a pressure lid, wherein the tip element or elements are arranged between the nozzle body and the pressure lid, which are each inserted into a recess of the nozzle body and are each penetrated by a movable closure needle having a tip, each of which protrudes in at least one operating position beyond an outer circumferential edge of the nozzle body, wherein the closure needles each have, on their ends facing away from the tip, a coupling means, which is coupled with a drive means for moving the closure needles, wherein the tip element or elements are supported on a buttress element inserted between the nozzle body and the pressure lid, the method comprising:

- 100) Removing the pressure lid;
- 200) after step 100), the drive means is removed, whereby the respective tip element is decoupled from the drive means;
- 300) after step 200), the buttress element is removed; and
- 400) after step 300) the one or more tip elements are removed.

\* \* \* \* \*